(12) United States Patent
Xiong et al.

(10) Patent No.: US 10,279,487 B2
(45) Date of Patent: May 7, 2019

(54) FOOT STRUCTURE AND HUMANOID ROBOT

(71) Applicant: UBTECH Robotics Corp., Shenzhen (CN)

(72) Inventors: Youjun Xiong, Shenzhen (CN); Feng Hu, Shenzhen (CN); Xinpu Chen, Shenzhen (CN)

(73) Assignee: UBTECH Robotics Corp., Shenzhen (CN)

(*) Notice: Subject to any disclaimer, the term of this patent is extended or adjusted under 35 U.S.C. 154(b) by 230 days.

(21) Appl. No.: 15/465,609

(22) Filed: Mar. 22, 2017

(65) Prior Publication Data

US 2018/0186015 A1   Jul. 5, 2018

(30) Foreign Application Priority Data

Dec. 29, 2016   (CN) .......................... 2016 1 1245266

(51) Int. Cl.
*B25J 17/00* (2006.01)
*B62D 57/032* (2006.01)

(52) U.S. Cl.
CPC ............ *B25J 17/00* (2013.01); *B62D 57/032* (2013.01); *Y10S 901/01* (2013.01); *Y10S 901/28* (2013.01)

(58) Field of Classification Search
CPC ........ B25J 17/00; B62D 57/032; B62D 57/02; Y10S 901/01; Y10S 901/28
See application file for complete search history.

(56) References Cited

U.S. PATENT DOCUMENTS

| 5,151,859 | A | * | 9/1992 | Yoshino | B62D 57/032 180/8.6 |
| 5,206,569 | A | * | 4/1993 | Ozawa | B62D 57/032 180/8.1 |
| 5,221,883 | A | * | 6/1993 | Takenaka | B62D 57/032 180/8.1 |
| 5,252,901 | A | * | 10/1993 | Ozawa | B62D 57/032 180/8.1 |
| 5,311,109 | A | * | 5/1994 | Ozawa | B62D 57/032 180/8.1 |
| 5,357,433 | A | * | 10/1994 | Takenaka | B62D 57/032 180/8.1 |
| 5,369,346 | A | * | 11/1994 | Takahashi | B62D 57/032 180/8.1 |
| 5,445,235 | A | * | 8/1995 | Gomi | B25J 19/0075 180/8.1 |

(Continued)

*Primary Examiner* — Joseph M Rocca
*Assistant Examiner* — Michael R Stabley

(57) ABSTRACT

A foot structure for contacting the ground and connecting to a leg structure of a humanoid robot, includes: a foot assembly for contacting the ground; a first servo mounted on the foot assembly and including a first output shaft; a connecting assembly rotatably connected to the foot assembly and to constitute an ankle portion; and a second servo mounted on the connecting assembly and connected with the leg structure, the second servo including a second output shaft perpendicular to the first output shaft; the connecting assembly being arranged perpendicularly to the foot assembly and including a first connecting structure used to mount the first output shaft and rotatably connected to the foot assembly, and a second connecting structure connected to the first connecting structure and used to mount the second output shaft.

20 Claims, 5 Drawing Sheets

(56) References Cited

U.S. PATENT DOCUMENTS

| | | | | |
|---|---|---|---|---|
| 5,872,893 | A * | 2/1999 | Takenaka | B62D 57/032 |
| | | | | 180/8.6 |
| 6,472,839 | B1 * | 10/2002 | Ishii | B25J 9/1638 |
| | | | | 318/568.12 |
| 6,696,809 | B2 * | 2/2004 | Ishii | B25J 9/1638 |
| | | | | 318/561 |
| 6,876,903 | B2 * | 4/2005 | Takenaka | B62D 57/032 |
| | | | | 318/568.15 |
| 7,099,743 | B2 * | 8/2006 | Lee | B25J 9/1065 |
| | | | | 318/568.1 |
| 7,143,850 | B2 * | 12/2006 | Takenaka | B25J 19/0012 |
| | | | | 180/8.6 |
| 7,278,501 | B2 * | 10/2007 | Mori | B25J 9/1641 |
| | | | | 180/8.5 |
| 7,366,587 | B2 * | 4/2008 | Iribe | B62D 57/032 |
| | | | | 180/8.1 |
| 7,561,941 | B2 * | 7/2009 | Kwon | A63H 11/00 |
| | | | | 180/8.2 |
| 9,327,785 | B2 * | 5/2016 | Alfayad | B25J 17/0283 |
| 10,144,464 | B1 * | 12/2018 | Buerger | B62D 57/032 |
| 2010/0114329 | A1 * | 5/2010 | Casler | B25J 19/0008 |
| | | | | 623/24 |

* cited by examiner

FOOT STRUCTURE AND HUMANOID ROBOT

CROSS REFERENCE TO RELATED APPLICATIONS

This application claims priority to Chinese Patent Application No. 201611245266.8, filed Dec. 29, 2016, which is hereby incorporated by reference herein as if set forth in its entirety.

BACKGROUND

1. Technical Field

The present disclosure generally relates to robotic technology, and particularly to a foot structure and a humanoid robot including the foot structure.

2. Description of Related Art

For a long time, robot technology is mainly used in the production process automation, and developed to improve production efficiency and processing precision. Such robots are collectively referred to as industrial robots. Another type of robots are humanoid robots that can complete a variety of services at home, such as cleaning, entertaining, and home security, which requires humanoid robots to have flexible joints.

Some conventional humanoid robots have one servo at a foot, resulting in the action of the humanoid robot not flexible enough.

SUMMARY

A foot structure for contacting the ground and connecting to a leg structure of a humanoid robot, includes: a foot assembly for contacting the ground; a first servo mounted on the foot assembly and including a first output shaft; a connecting assembly rotatably connected to the foot assembly and to constitute an ankle portion; and a second servo mounted on the connecting assembly and used to connect with the leg structure, the second servo including a second output shaft perpendicular to the first output shaft; the connecting assembly being arranged perpendicularly to the foot assembly and including a first connecting structure used to mount the first output shaft and rotatably connected to the foot assembly, and a second connecting structure connected to the first connecting structure and used to mount the second output shaft.

A humanoid robot includes a head, a trunk connected with the head, and two legs and two arms connected to the trunk. Each of the legs includes a leg structure connected to a waist structure and the above foot structures connected to the leg structures.

Compared with conventional foot structures, the foot structure of the present disclosure has an advantage as follows. The foot structure is provided by connecting the first servo on the foot assembly and rotatably connecting the connecting assembly in a position near the ankle of the foot assembly. The first servo drives the connecting assembly to rotate with respect to the foot assembly, i.e. driving the leg structure to rotate with respect to the foot assembly. The connecting assembly includes a second servo connected to the leg structure. The connecting assembly, driven by the second servo, drives the foot assembly and the first servo to rotate with respect to the leg structure, thereby increasing the degree of freedom of the foot structure, making the foot structure more flexible.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
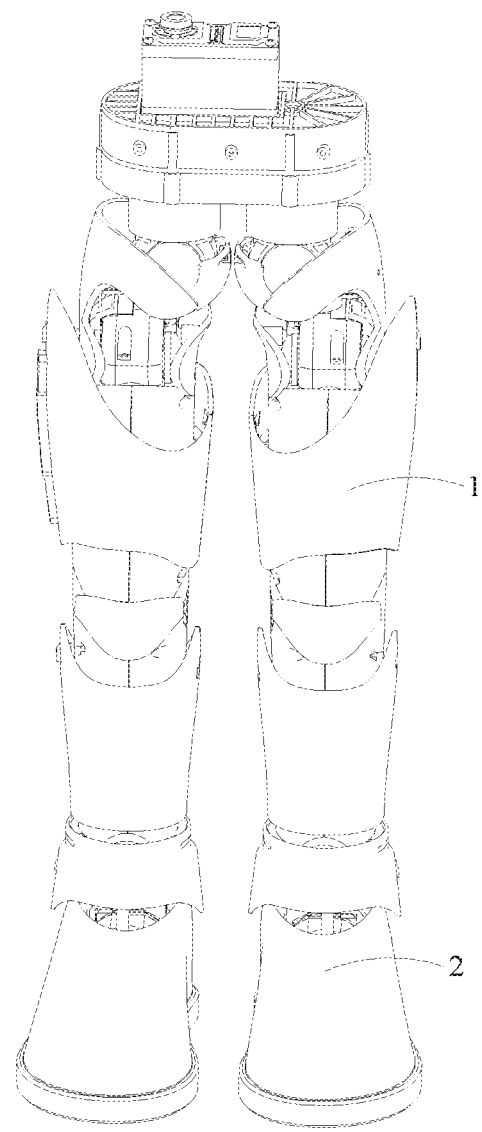
FIG. 1 is an isometric view of an assembly of leg structures and foot structures according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Referring to FIGS. 1-5, in one embodiment, a foot structure 2 is used for contacting the ground so as to play a role of supporting and is connected to a leg structure 1 of a humanoid robot. The foot structure 2 includes a foot assembly 20 for contacting the ground, a first servo 40 mounted on the foot assembly 20, a connecting assembly 30 rotatably connected to the foot assembly 20 and used to constitute an ankle portion, and a second servo 50 mounted on the connecting assembly 30 and used to connect with the leg structure 1. The first servo includes a first output shaft 42. The second servo 50 includes a second output shaft 52 perpendicular to the first output shaft 42. The connecting assembly 30 is arranged perpendicularly to the foot assembly 20 and includes a first connecting structure 32 used to mount the first output shaft 42 and rotatably connected to the foot assembly 20, and a second connecting structure 34 connected to the first connecting structure 32 and used to mount the second output shaft 52. The foot structure 2 of the present disclosure has an advantage as follows. The foot structure 2 is provided by connecting the first servo 40 on the foot assembly 20 and rotatably connecting the connecting assembly 30 in a position near the ankle of the foot assembly 20. The first servo 40 drives the connecting assembly 30 to rotate with respect to the foot assembly 20, i.e. driving the leg structure 1 to rotate with respect to the foot assembly 20. The connecting assembly 30 includes a second servo 50 connected to the leg structure 1. The connecting assembly 30, driven by the second servo 50, drives the foot assembly 20 and the first servo 40 to rotate with respect to the leg structure 1, thereby increasing the degree of freedom of the foot structure 2, making the foot structure 2 more flexible.

In the embodiment, the foot assembly 20 is substantially perpendicular to the connecting assembly 30, and they may be in fully perpendicular state or in a state close to the fully perpendicular state.

In the embodiment, the first output shaft 42 of the first servo 40 is mounted on the connecting assembly 30 and the first connection structure 32 is rotatably connected to the foot assembly 20. When driven by the first servo 40, the first connection structure 32 rotates, together with the second connection structure 34 and the second servo 50, with respect to the first output shaft 42. The second output shaft 52 of the second servo 50 is mounted on the second connecting structure 34. When driven by the second servo 50, the second connecting structure 34 rotates, together with the first connecting structure 32, the foot assembly 20 and the first servo 40, with respect to the second output shaft 52. Thus, the foot structure 2 has at least two degrees of freedom, i.e. a first rotation around the first output shaft 42 and a second rotation around the second output shaft 52, which improves the flexibility of the foot structure 2.

Referring to FIGS. 2-5, further, the foot assembly 20 includes a bottom plate 22, a fixing portion 220 and a mounting portion 228 that protrude from the bottom plate 22 toward the leg structure 1, and a mounting block 24 fixed to the bottom plate 22 and opposite to the mounting portion 228. The housing of the first servo 40 is fixed to the fixing portion 220. The first output shaft 42 is mounted to the first connecting structure 32, and opposite ends of the first output shaft 42 are connected to the mounting portion 228 and the mounting block 24. The foot structure 2 fixes the housing of the first servo 40 to the mounting portion 228 so that the first servo 40 and the foot assembly 20 are secured together, causing them to be rotatable in the same time. The mounting block 24 is fixed to the bottom plate 22 opposite to the mounting portion 228. The mounting block 24 and the mounting portion 228 are used to mount the first connecting structure 32 therebetween. The first connecting structure 32 accommodates the first output shaft 42 therein. It is to be understood that opposite ends of the first output shaft 42 are mounted within the first connecting structure 32, allowing the first connecting structure 32 to rotate with respect to the first servo 40. Opposite sides of the first connecting structure 32 are respectively mounted on the mounting portion 228 and the mounting block 24, enabling the first connecting structure 32 to be rotatable with respect to the foot assembly 20. Since the foot assembly 20 and the first servo 40 are fixed to each other, the first connecting structure 32 is rotatable with respect to the foot assembly 20 and the first servo 40.

In the embodiment, the bottom plate 22, the fixing portion 220 and the mounting portion 228 are integrally formed. The mounting block 24 is securely connected to the bottom plate 22 by fasteners.

Figure 3:
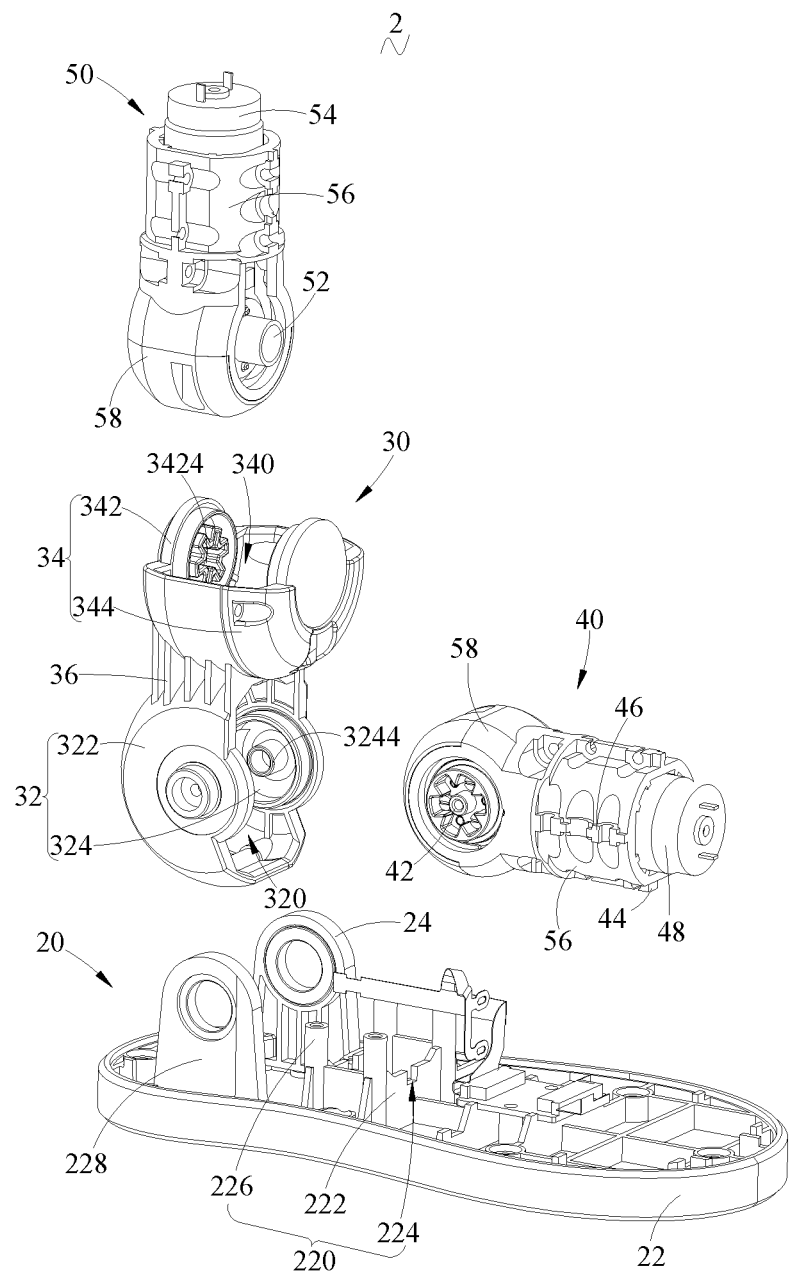
FIG. 3 is an exploded isometric view of the foot structure of FIG. 2.
Figure 4:
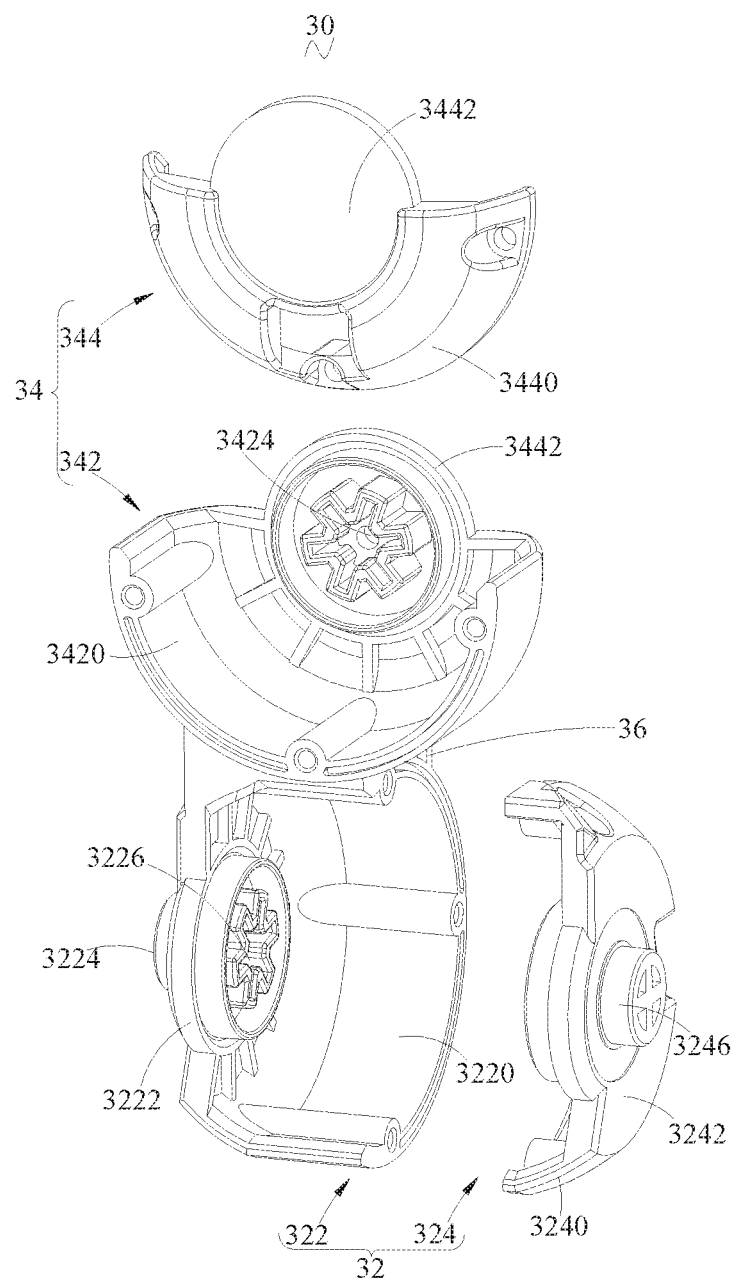
FIG. 4 is an exploded isometric view of a connecting assembly of FIG. 3, viewed from a first viewpoint.
Figure 5:
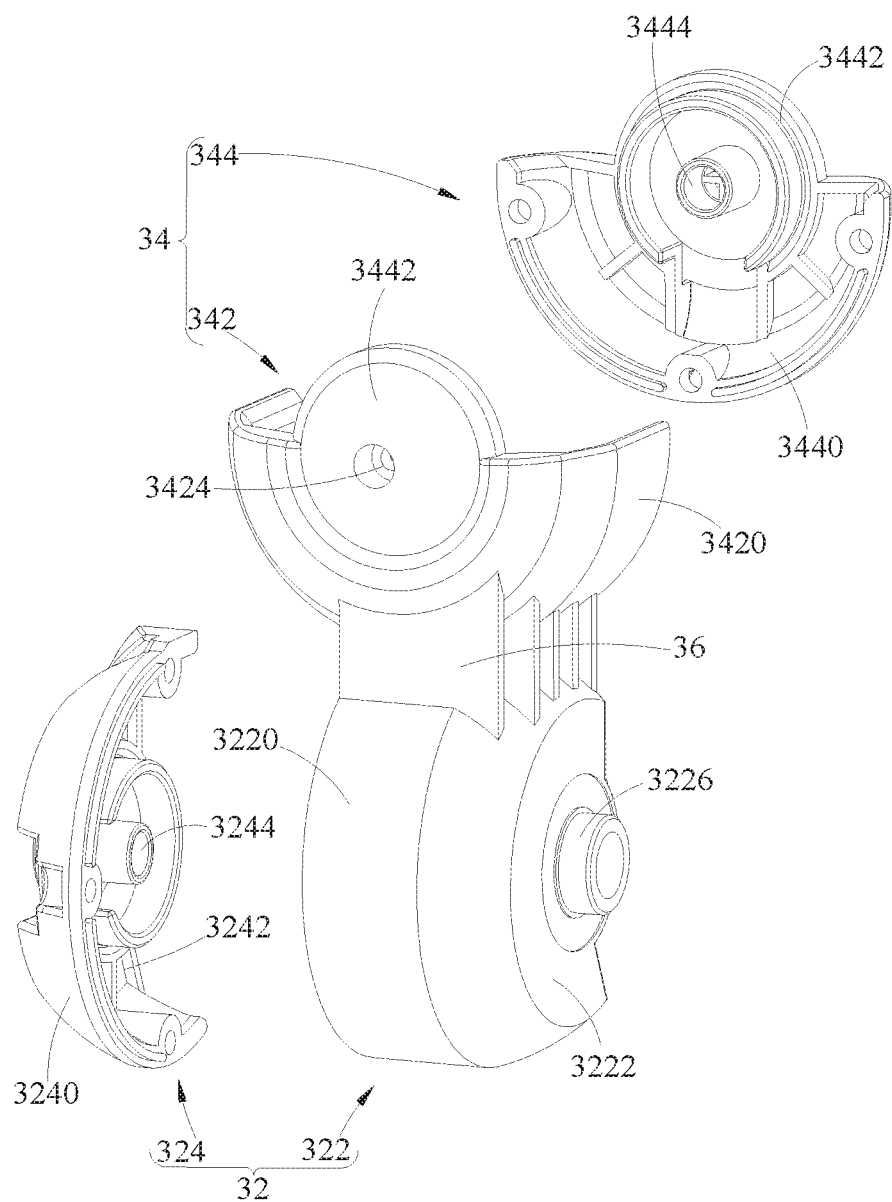
FIG. 5 is an exploded isometric view of a connecting assembly of FIG. 3, viewed from a second viewpoint.

Referring to FIGS. 3-5, the fixing portion 220 includes a stopper 222 provided with a stopper groove 224 and fixing posts 226 located at opposite sides of the stopper 222. An outer surface of the first servo 40 is provided with a protruding block 44 received in the stopper groove 224 and a connecting block 46 arranged opposite to the fixing posts 226 and securely connected to the fixing posts 226 by fasteners. The foot assembly 20 is provided by providing a stopper 222 on the bottom plate 22 and providing the stopper groove 224 in the stop block 222 to prevent the first servo 40 from moving left and right with respect to the bottom plate 22 and rotating about the bottom plate 22. By arranging the fixing posts 226 at opposite sides of the stopper block 222 on the bottom plate 22, on the one hand, it is used for connecting with the connecting block 46 on the housing of the first servo 40, and the other hand, it restricts the first servo 40 from moving left and right with respect to the bottom plate 22, which ensure the firmness and stability of the connection of the first servo 40 to the bottom plate 22, and reduces the relative shaking and movement between the servo 40 and the bottom plate 22.

In the embodiment, the stopper 222, the fixing posts 226 and the bottom plate 22 are integrally formed. The housing of the first servo 40, the protruding block 44 and the connecting block 46 are integrally formed.

Referring to FIGS. 3-5, the first connecting structure 32 includes a first side cover 322 and a first end cover 324 which are securely connected to each other and define cooperatively a first receiving chamber 320. The second connecting structure 34 includes a second side cover 342 and a second end cover 344 which are securely connected to each other and define cooperatively a second receiving chamber 340. The first side cover 322 and the second side cover 342 are integrally formed with each other. The first servo 40 is partly accommodated in the first receiving chamber 320, and the second servo 50 is partly received in the second receiving chamber 340. In the embodiment, the first side cover 322 and the second side cover 342 are integrally formed with each other so as to form a unitary structure, which ensures the firmness and the stability of the connection of the first and second servos 40 and 50, and avoids the rotation/shaking of the first connecting structure 32 with respect to the second side cover 342 during the rotation of the first side cover 322 and the first end cover 324 with respect to the first servo 40. Same effect also applies to the second servo 50. The first servo 40 is partly accommodated in the first receiving chamber 320 formed by the first side cover 322 and the first end cover 324, and the second servo 50 is partly accommodated in the second side cover 342 and the second end cover 344, which prevents the first servo 40 and the second servo 50 from moving and shaking in the respective axial directions when they are rotated.

In the embodiment, the first side cover 322 and the second side cover 342 are stacked along the longitudinal direction of the leg structure 1 to form an ankle portion of the foot structure 2.

In other embodiment, the first side cover 322 and the second side cover 342 may be two independent members, and securely connected to each other by detachable/undetachable connection means.

Referring to FIGS. 3-5, the first side cover 322 includes a first connecting portion 3220 securely connected to the first end cover 324 and a first side end cover 3222 that extends along the first connecting portion 3220 and is provided with a first pivot shaft 3224 protruding therefrom. The first side end cover 3222 defines a first shaft hole 3226. The first end cover 324 includes a first side plate 3240 securely connected to the first connecting portion 3220 and a first cover portion 3242 extending along the first side plate 3240 and provided with a second pivot shaft 3246 protruding therefrom. The first cover portion 3242 is provided with a second shaft hole 3244 that is arranged opposite to and coaxial with the first shaft hole 3226. Opposite ends of the first output shaft 42 are respectively received in the first shaft hole 3226 and the second shaft hole 3244. The first pivot shaft 3224 and the second pivot shaft 3246 are arranged opposite to each other outside the first connecting structure 32 and are pivotally connected to the foot assembly 20. The first connecting portion 3220 of the firsts side cover 322 and the first side plate 3240 of the first end cover 324 are fixed to each other by screws, which forms a guide groove for the first servo 40. That is, the first connecting portion 3220 and the first side plate 3240 cooperatively define a guide groove that has a shape similar to the shape of the first servo 40. The shape of the first servo 40 refers to the shape of the portion accommodated in the first receiving chamber 320. Opposite ends of the first output shaft 42 of the first servo 40 are respectively received in the first shaft hole 3226 of the first side cover 3222 and the second shaft hole 3244 of the first cover portion 3242, which enables the first side end cover 3222 and the first cover portion 3242 to be rotatable about the first output shaft with respect to the first servo 40.

In the embodiment, the first side cover 3222 faces the first cover portion 3242. The first shaft hole 3226 and the second shaft hole 3244 are coaxial with each other.

In the embodiment, the first connecting portion 3220 and the first side end cover 3222 are integrally formed. The first side plate 3240 and the first cover portion 3242 are integrally formed.

In the embodiment, the mounting portion 228 and the mounting block 24 each define a mounting hole (not labeled) for mounting the first side cover 322. The first pivot shaft 3224 and the second pivot shaft 3246 are respectively inserted into the two mounting holes, enabling the first side cover 322 to be rotatable with respect to the foot assembly 20.

Referring to FIGS. 3-5, the first connecting portion 3220 and the first side plate 3240 cooperatively form an arc-shaped first receiving chamber 320. A gap is formed between a housing of the first servo 40 and each of the inner walls of the first connecting portion 3220 and the first side plate 3240. It is to be understood that the portion of the first servo 40 housed in the first receiving chamber 320 is arc-shaped in a cross section perpendicular to the first output shaft 42, and the first housing chamber 320 accommodating the first servo 40 is also arc-shaped in a cross section perpendicular to the first output shaft 42, to ensure the stability and reliability of the rotation of the first servo 40 within the first housing chamber 320. The leg structure 1 provides a clearance between the housing of the first servo 40 and the inner wall of the first receiving chamber 320 to ensure that the first servo 40 can smoothly rotate in the first receiving chamber 320.

Referring to FIGS. 3-5, the second side cover 342 includes a second connecting portion 3420 that is securely connected to the second end cover 344 and is integrally formed with the first connecting portion 3220, and a second side end cover 3422 extending along the second connecting portion 3420. The second side end cover 3422 is provided with a first connecting hole 3424, The second end cover 344 includes a second side plate 3440 securely connected to the second connecting portion 3420 and a second cover portion 3442 extending along the second side plate 3440. The second cover portion 3442 is provided with a second connecting hole 3444 that is arranged opposite to and coaxial with the first connecting hole 3424. Opposite ends of the second output shaft 52 are respectively received in the first connecting hole 3424 and the second connecting hole 3444. The second connecting portion 3420 of the second side cover 342 and the second side plate 3440 of the second end cover 344 are securely connected to each other by screws to form a guide groove for the second servo 50. That is, the second connecting portion 3420 and the second side plate 3440 define cooperatively a guide groove which is similar to the shape of the second servo 50. The shape of the second servo 40 here refers to the shape of the portion accommodated in the second receiving chamber 340. Opposite ends of the second output shaft 52 of the second servo 50 are respectively received in the first connecting hole 3424 of the second side cover 3422 and the second connecting hole 3444 of the second cover portion 3442, which enables the second side end cover 3422 and the second cover portion 3442 to be rotatable about the second output shaft 52 with respect to the second servo 50.

In the embodiment, the second side end cover 3422 faces the second cover portion 3442, and the first connecting hole 3424 and the second connecting hole 3444 are coaxial with each other.

In the embodiment, the second connecting portion 3420 and the second side end cover 3422 are integrally formed. The second side plate 3440 and the second cover portion 3442 are integrally formed.

Referring to FIGS. 3-5, the second connecting portion 3420 and the second side plate 3440 cooperatively form an arc-shaped second receiving chamber 340. A gap is formed between a housing of the second servo 50 and each of inner walls of the second connecting portion 3420 and the second side plate 3440. It is understood that the portion of the second servo 50 accommodated in the second receiving chamber 340 is arc-shaped in a cross section perpendicular to the second output shaft 52. The second receiving chamber 340, which houses the second servo 50, is also arc-shaped in a direction perpendicular to the second output shaft 52 to ensure the stability and reliability of the rotation of the second servo 50 within the second receiving chamber 340. The leg structure 1 is provided with a clearance between the housing of the second servo 50 and the inner wall of the second receiving chamber 340 to ensure that the second servo 50 can smoothly rotate in the second receiving chamber 340.

Referring to FIGS. 4-5, the connecting assembly 32 further includes a plurality of ribs 36 spaced apart from each other and extending along an outer surface of the first connecting portion 3220 toward an outer surface of the second connecting portion 3420. The connecting assembly 32 is provided with the ribs 36 on the outer surfaces of the first connecting portion 3220 and the second connecting portion 3420 to ensure the strength of connection between the first connecting portion 3220 and the second connecting portion 3420, and avoid deformation of the first connecting portion 3220 and the second connecting portion 3420. It is to be understood that the ribs 36, the first connecting portion 3220 and the second connecting portion 3420 are integrally formed.

In the embodiment, the ribs 36 are plural and distributed with equal spacing between the first connecting portion 3220 and the second connecting portion 3420 so that the distribution of the force applied thereon are uniform.

Figure 2:
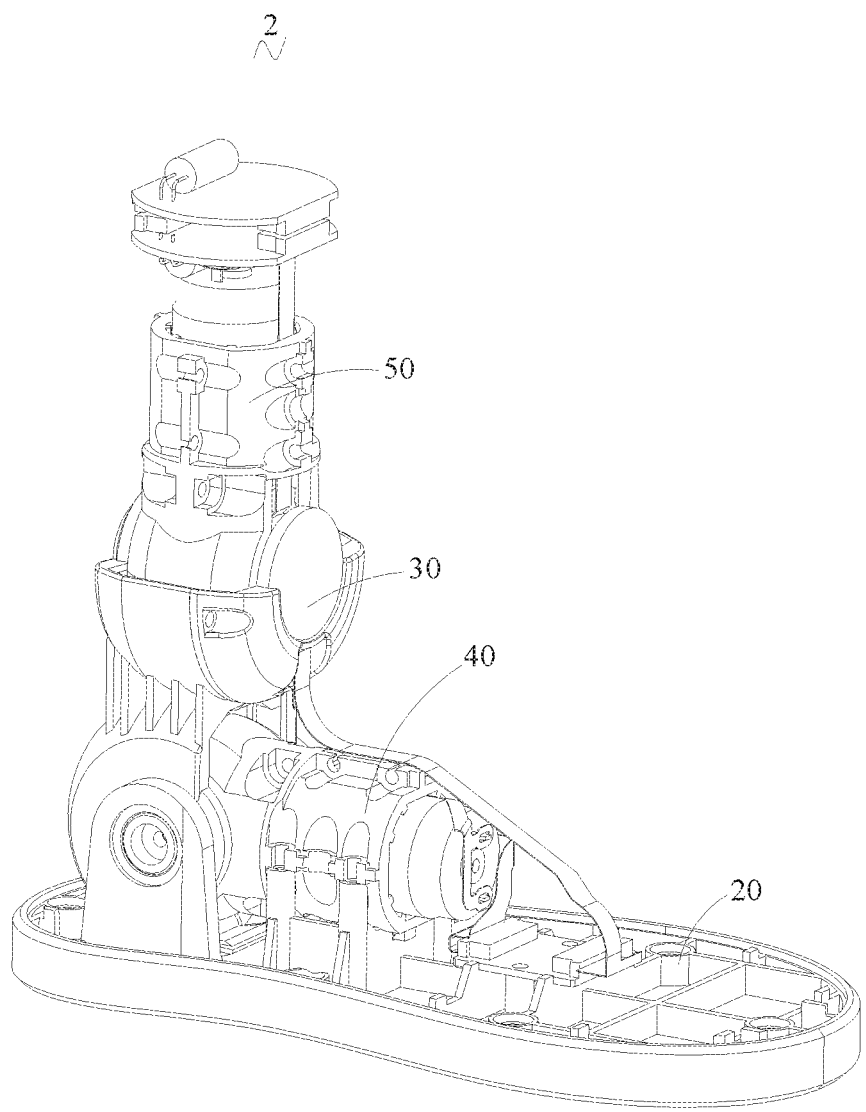
FIG. 2 is an isometric view of a foot structure of FIG. 1.

Referring to FIGS. 2 and 3, the first servo 40 and the second servo 50 are both spherical. The first servo 40 and the second servo 50 each include a power component 56 and a spherical mechanism 58 for outputting power of the power component 56. The spherical mechanism 58 of the first servo 40 includes the first output shaft 42, and the spherical mechanism 58 of the second servo 50 includes the second output shaft 52. It is to be understood that the first and second servos 40 and 50 are arranged along the longitudinal direction of the leg structure 1 and the spherical mechanisms 58 of the two face each other and are arranged at the same side of the connecting assembly.

Referring to FIGS. 2 and 3, the first servo 40 includes a first connection end 48 connected to the foot assembly 20. The first connection end 48 is located on a side of the power component 56 of the first servo 40 away from the spherical mechanism 58. The second servo 50 includes a second connection end 54 connected to the foot assembly 20. The second connection end 54 is located on a side of the power component 56 of the second servo 50 away from the spherical mechanism 58. An axis of the first connection end 48 and an axis of the second connection end 54 are arranged perpendicular to each other. It is to be understood that the first and second servos 40 and 50 are arranged along the longitudinal direction of the leg structure 1 and the spherical mechanisms 58 of the two face each other and are located at the same side of the connecting assembly. The first connection end 48 and the second connection end 54 are located at opposite sides away from the connecting assembly. The axis of the first connection end 48 and the axis of the second connection end 54 are perpendicular to each other so as to ensure that the leg structure 1 moves freely and is able to support a waist structure. The first connection end 48 and the second connection end 54 are located at opposite sides away from the connecting assembly. The axis of the first connection end 48 and the axis of the second connection end 54 are perpendicular to each other so as to ensure that the foot structure 2 moves freely and is able to support the leg structure 1.

Referring to FIGS. 1-5, in the foregoing embodiments, the first servo 40 and the second servo 50 are spherical servos. That is, one end of each of their housings is spherical and the other end is substantially cylindrical. They each include a power component 56, a reduction mechanism rotating as driven by the power component 56, and the output shaft provided at the output end of the reduction mechanism. The reduction mechanism is realized by multi-stage gear transmission. It is to be understood that the internal power structures of the first and second servos 40 and 50 are not limited thereto and may be of any configuration that can provide power.

Referring to FIGS. 1-5, a humanoid robot includes a head, a trunk connected with the head, and two legs and two arms connected to the trunk. Each of the legs includes a leg structure connected to a waist structure and foot structures 2 of the foregoing embodiments connected to the leg structures.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A foot structure for contacting the ground and connecting to a leg structure of a humanoid robot, comprising:
   a foot assembly for contacting the ground;
   a first servo mounted on the foot assembly and comprising a first output shaft;
   a connecting assembly rotatably connected to the foot assembly and configured to constitute an ankle portion; and
   a second servo mounted on the connecting assembly and configured to connect with the leg structure, the second servo comprising a second output shaft perpendicular to the first output shaft;
   the connecting assembly being arranged perpendicularly to the foot assembly and comprising a first connecting structure configured to mount the first output shaft and rotatably connected to the foot assembly, and a second connecting structure connected to the first connecting structure and configured to mount the second output shaft;
   wherein the foot assembly comprises a bottom plate, a fixing portion and a mounting portion that protrude toward the leg structure, and a mounting block fixed to the bottom plate and opposite to the mounting portion, the first servo is fixed to the fixing portion, the first output shaft is mounted to the first connecting structure, and opposite ends of the first output shaft are connected to the mounting portion and the mounting block.

2. The foot structure of claim 1, wherein the fixing portion comprises a stopper provided with a stopper groove and fixing posts located on opposite sides of the stopper, and an outer surface of the first servo is provided with a protruding block received in the stopper groove and a connecting block arranged opposite to the fixing posts and securely connected to the fixing posts by fasteners.

3. The foot structure of claim 1, wherein the first connecting structure comprises a first side cover and a first end cover which are securely connected to each other and define a first receiving chamber, the second connecting structure comprises a second side cover and a second end cover which are securely connected to each other and define a second receiving chamber, the first side cover and the second side cover are integrally formed with each other, the first servo is partly accommodated in the first receiving chamber, and the second servo is partly received in the second receiving chamber.

4. The foot structure of claim 3, wherein the first side cover comprises a first connecting portion securely connected to the first end cover and a first side end cover that extends along the first connecting portion and is provided with a first pivot shaft protruding therefrom, the first side end cover defines a first shaft hole, the first end cover comprises a first side plate securely connected to the first connecting portion and a first cover portion extending along the first side plate and provided with a second pivot shaft protruding therefrom, the first cover portion is provided with a second shaft hole that is arranged opposite to and coaxial with the first shaft hole, opposite ends of the first output shaft are respectively received in the first shaft hole and the second shaft hole, and the first pivot shaft and the second pivot shaft are arranged opposite to each other outside the first connecting structure and are pivotally connected to the foot assembly.

5. The foot structure of claim 4, wherein the first connecting portion and the first side plate cooperatively form an arc-shaped first receiving chamber, and a gap is formed between a housing of the first servo and each of inner walls of the first connecting portion and the first side plate.

6. The foot structure of claim 4, wherein the second side cover comprises a second connecting portion that is securely connected to the second end cover and is integrally formed with the first connecting portion, and a second side end cover extending along the second connecting portion, and the second side end cover is provided with a first connecting hole, the second end cover comprises a second side plate securely connected to the second connecting portion and a second cover portion extending along the second side plate, the second cover portion is provided with a second connecting hole that is arranged opposite to and coaxial with the first connecting hole, and opposite ends of the second output shaft are respectively received in the first connecting hole and the second connecting hole.

7. The foot structure of claim 6, wherein the second connecting portion and the second side plate cooperatively form an arc-shaped second receiving chamber, and a gap is formed between a housing of the second servo and each of inner walls of the second connecting portion and the second side plate.

8. The foot structure of claim 6, wherein the connecting assembly further comprises a plurality of ribs spaced apart from each other and extending along an outer surface of the first connecting portion toward an outer surface of the second connecting portion.

9. The foot structure of claim 1, wherein the first servo and the second servo are both spherical, the first servo and the second servo each comprise a power component and a spherical mechanism for outputting power of the power component, the spherical mechanism of the first servo comprises the first output shaft, and the spherical mechanism of the second servo comprises the second output shaft.

10. The foot structure of claim 9, wherein the first servo comprises a first connection end connected to the foot assembly, the first connection end is located on a side of the power component of the first servo away from the spherical mechanism; the second servo comprises a second connection end connected to the foot assembly, the second connection end is located on a side of the power component of the second servo away from the spherical mechanism, an axis of the first connection end and an axis of the second connection end are arranged perpendicular to each other.

11. A humanoid robot comprising a head, a trunk connected with the head, and two legs and two arms connected to the trunk, each of the legs comprising a leg structure connected to a waist structure and the foot structure of claim 1 connected to the leg structure.

12. A foot structure for contacting the ground and connecting to a leg structure of a humanoid robot, comprising:
a foot assembly for contacting the ground;
a first servo mounted on the foot assembly and comprising a first output shaft;
a connecting assembly rotatably connected to the foot assembly and configured to constitute an ankle portion; and
a second servo mounted on the connecting assembly and configured to connect with the leg structure, the second servo comprising a second output shaft perpendicular to the first output shaft;
the connecting assembly being arranged perpendicularly to the foot assembly and comprising a first connecting structure configured to mount the first output shaft and rotatably connected to the foot assembly, and a second connecting structure connected to the first connecting structure and configured to mount the second output shaft,
wherein the first servo is rotatably and at least partly received within the first connecting structure, and the second servo is rotatably and at least partly received within the second connecting structure.

13. The foot structure of claim 12, wherein the foot assembly comprises a bottom plate, a fixing portion and a mounting portion that protrude toward the leg structure, and a mounting block fixed to the bottom plate and opposite to the mounting portion, the first servo is fixed to the fixing portion, the first output shaft is mounted to the first connecting structure, and opposite ends of the first output shaft are connected to the mounting portion and the mounting block.

14. The foot structure of claim 13, wherein the fixing portion comprises a stopper provided with a stopper groove and fixing posts located on opposite sides of the stopper, and an outer surface of the first servo is provided with a protruding block received in the stopper groove and a connecting block arranged opposite to the fixing posts and securely connected to the fixing posts by fasteners.

15. The foot structure of claim 12, wherein the first connecting structure comprises a first side cover and a first end cover which are securely connected to each other and define a first receiving chamber, the second connecting structure comprises a second side cover and a second end cover which are securely connected to each other and define a second receiving chamber, the first side cover and the second side cover are integrally formed with each other, the first servo is partly accommodated in the first receiving chamber, and the second servo is partly received in the second receiving chamber.

16. The foot structure of claim 15, wherein the first side cover comprises a first connecting portion securely connected to the first end cover and a first side end cover that extends along the first connecting portion and is provided with a first pivot shaft protruding therefrom, the first side end cover defines a first shaft hole, the first end cover comprises a first side plate securely connected to the first connecting portion and a first cover portion extending along the first side plate and provided with a second pivot shaft protruding therefrom, the first cover portion is provided with a second shaft hole that is arranged opposite to and coaxial with the first shaft hole, opposite ends of the first output shaft are respectively received in the first shaft hole and the second shaft hole, and the first pivot shaft and the second pivot shaft are arranged opposite to each other outside the first connecting structure and are pivotally connected to the foot assembly.

17. The foot structure of claim 16, wherein the first connecting portion and the first side plate cooperatively form an arc-shaped first receiving chamber, and a gap is formed between a housing of the first servo and each of inner walls of the first connecting portion and the first side plate.

18. The foot structure of claim 16, wherein the second side cover comprises a second connecting portion that is securely connected to the second end cover and is integrally formed with the first connecting portion, and a second side end cover extending along the second connecting portion, and the second side end cover is provided with a first connecting hole, the second end cover comprises a second side plate securely connected to the second connecting portion and a second cover portion extending along the second side plate, the second cover portion is provided with a second connecting hole that is arranged opposite to and coaxial with the first connecting hole, and opposite ends of the second output shaft are respectively received in the first connecting hole and the second connecting hole.

19. The foot structure of claim 18, wherein the second connecting portion and the second side plate cooperatively form an arc-shaped second receiving chamber, and a gap is formed between a housing of the second servo and each of inner walls of the second connecting portion and the second side plate.

20. The foot structure of claim 18, wherein the connecting assembly further comprises a plurality of ribs spaced apart from each other and extending along an outer surface of the first connecting portion toward an outer surface of the second connecting portion.

* * * * *